(12) United States Patent
Takakuwa et al.

(10) Patent No.: US 6,597,509 B2
(45) Date of Patent: Jul. 22, 2003

(54) MICROLENS ARRAY, MANUFACTURING METHOD THEREOF, OPTICAL DEVICE AND ELECTRONIC DEVICE WITH REFLECTIVE ALIGNMENT MARK IN LENS LAYER

(75) Inventors: Atsushi Takakuwa, Shiojiri (JP); Mutsumi Tamura, Suwa (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 10/032,299

(22) Filed: Dec. 21, 2001

(65) Prior Publication Data

US 2002/0141067 A1 Oct. 3, 2002

(30) Foreign Application Priority Data

Dec. 27, 2000 (JP) ........................................ 2000-397012

(51) Int. Cl.[7] ........................ G02B 27/10; G03B 21/60; G01B 11/00
(52) U.S. Cl. ........................ 359/619; 359/619; 359/620; 359/455; 356/401
(58) Field of Search ................................. 359/619, 620, 359/621, 623, 455, 459; 356/401

(56) References Cited

U.S. PATENT DOCUMENTS 5,850,276 A * 12/1998 Ochi et al. .................. 349/158
2002/0027715 A1 * 3/2002 Shimizu et al. ............. 359/619

FOREIGN PATENT DOCUMENTS

JP  2002235105  * 8/2000 ........... B29D/11/00

* cited by examiner

Primary Examiner—Ricky Mack
Assistant Examiner—Alicia M Harrington
(74) Attorney, Agent, or Firm—Harness, Dickey & Pierce, P.L.C.

(57) ABSTRACT

A method for manufacturing a microlens array including the steps of forming a reflecting layer as a mark composed of at least one of a raised part and a recessed part in a first light-transmitting layer having a plurality of lenses and the mark, the reflecting layer having a higher reflectance than that of the first light-transmitting layer; and forming a second light-transmitting layer so as to cover at least the lenses.

15 Claims, 12 Drawing Sheets

(A)

(B)

(A)

(B)

(C)

MICROLENS ARRAY, MANUFACTURING METHOD THEREOF, OPTICAL DEVICE AND ELECTRONIC DEVICE WITH REFLECTIVE ALIGNMENT MARK IN LENS LAYER

TECHNICAL FIELD

The present invention relates to a microlens array, a manufacturing method thereof, an optical device, and an electronic device.

BACKGROUND ART

Hitherto, microlens arrays in which a plurality of minute lenses are arranged have been used for, for example, liquid crystal panels. When using the microlens array, light entering each pixel is focused by each lens; hence, a bright display is achieved. Known methods for manufacturing the microlens array are dry etching and wet etching.

However, the above methods require a lithography process for each step of forming the individual microlens arrays, thus increasing the costs. As disclosed in Japanese Unexamined Patent Application Publication No. 3-198003, the following method for manufacturing a microlens array has been developed: a resin is dripped onto a master on which spherical (curved) surfaces corresponding to individual lenses are formed, and then the resulting resin is solidified and is detached.

A second light-transmitting layer composed of a resin having a refractive index different from the microlens array is generally formed above the microlens array, and a protective layer composed of glass or the like is formed above the second light-transmitting layer, if necessary. A black matrix, a transparent electrode layer, and an orientation film are further formed above the same, and this laminate is used for the opposing substrate of a liquid crystal panel.

The black matrix is formed using lithographic techniques. In detail, a light shield material such as Cr is deposited above the microlens array. Then, a resist layer is formed on the same, is patterned by performing exposure through a mask having a predetermined pattern, development is performing, and then the black matrix is provided by performing etching by using the patterned resist as a mask.

Since it is required to precisely form the black matrix between the lenses, the mask is aligned with the lenses when performing exposure.

Since precise alignment is required when forming the black matrix having high quality, there is a problem in that conventional microlens array manufacturing methods can not comply with this requirement.

SUMMARY OF THE INVENTION

It is an object of the present invention to provide a microlens array which can be precisely aligned with other members, a manufacturing method thereof, and an optical device.

A method for manufacturing a microlens array according to the present invention includes the steps of forming a reflecting layer as a mark in a first light-transmitting layer having a plurality of lenses and the mark composed of at least one of a raised part and a recessed part, the reflecting layer having a higher reflectance than that of the first light-transmitting layer; and forming a second light-transmitting layer so as to cover at least the lenses.

The present invention provides a microlens array having a first light-transmitting layer having a plurality of lenses and a mark having at least one of a raised part and a recessed part formed, a reflecting layer which has a higher reflectance than that of the first light-transmitting layer being formed as the mark, and a second light-transmitting layer formed so as to cover at least the lenses.

EMBODIMENTS OF THE INVENTION

Figure 1:
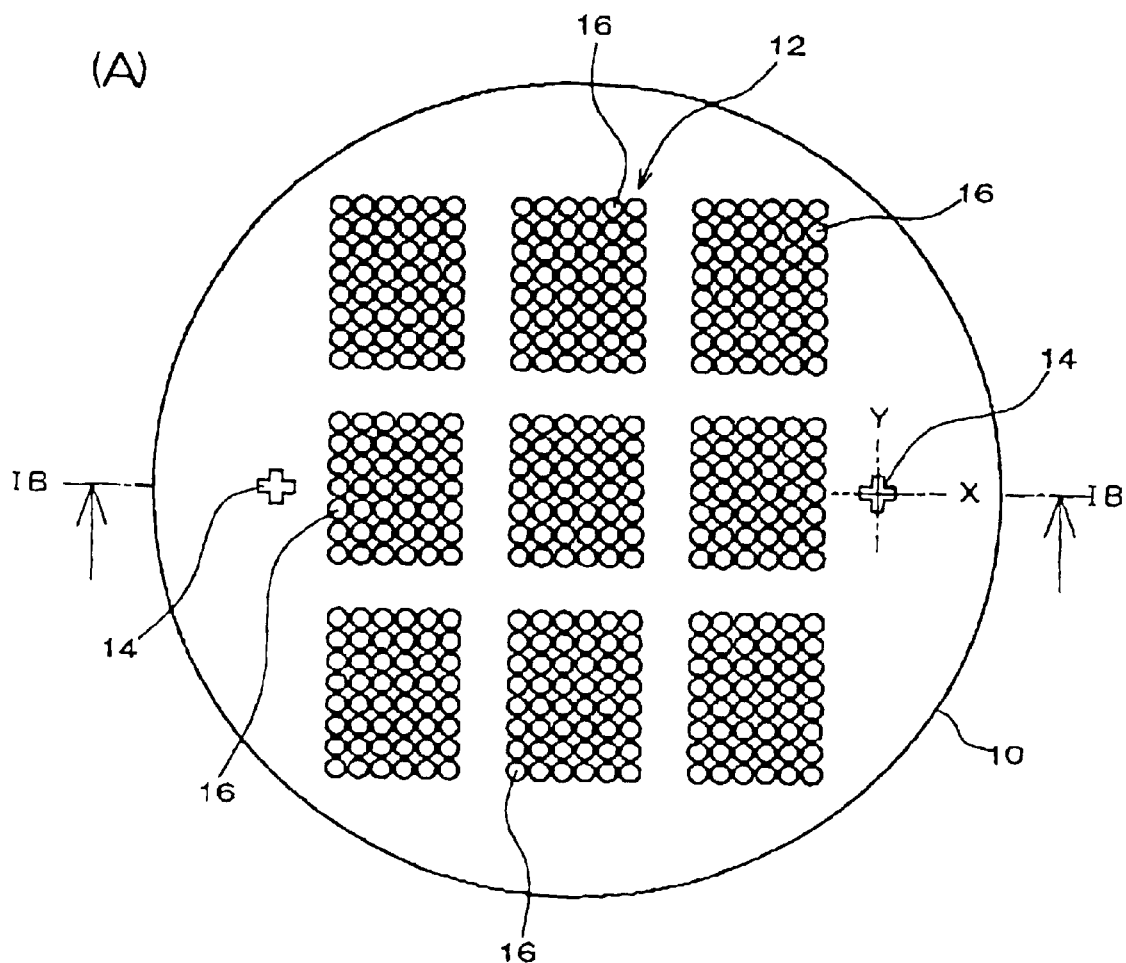
FIGS. 1(A) and 1(B) show a master used for manufacturing a microlens array according to an embodiment of the present invention.
Figure 1:
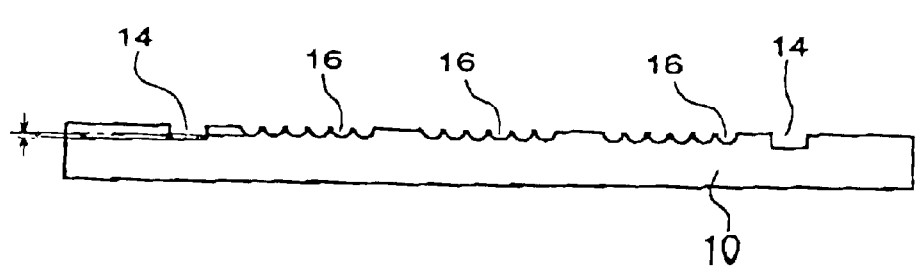

A method for manufacturing a microlens array according to the present invention includes the steps of forming a reflecting layer as a mark composed in a first light-transmitting layer having a plurality of lenses and the mark composed of at least one of a raised part and a recessed part the reflecting layer having a higher reflectance than that of the first light-transmitting layer; and forming a second light-transmitting layer so as to cover at least the lenses. According to the present invention, since the mark has the reflecting layer, the mark is easily recognized due to the difference in light reflectance between the mark and other parts, in the first light-transmitting layer. Alignment of the first light transmitting layer with other members is easily performed by use of the mark.

Furthermore, preferable embodiments of the present invention will now be described.

The above method for manufacturing a microlens array may preferably include the following steps of forming the first light-transmitting layer having the lenses and the mark, which are integrated, by using a first light-transmitting layer precursor; and forming the second light-transmitting layer by providing a second light-transmitting layer precursor above the first light-transmitting layer. Thus, the second light-transmitting layer is formed above the first light-transmitting layer in a bonded manner. The method for manufacturing a microlens array may preferably include the steps of providing the first light-transmitting layer precursor above a surface of a master having a lens-forming pattern and a mark-forming pattern; transferring the shapes of the lens-forming pattern and the mark-forming pattern to the first light-transmitting layer precursor; and detaching the first light-transmitting layer, comprising the first light-transmitting layer precursor, from the master. Thus, the lenses and the mark are easily formed by transferring.

The method for manufacturing a microlens array may preferably include the step of forming a layer and etching the resulting layer after forming the second light-transmitting layer, wherein the etching is performed after covering the layer with a resist patterned in a lithography step, and alignment of a mask used in the lithography step with the first light-transmitting layer may be performed using the mark. Thus, the mask is easily aligned with the first light-transmitting layer.

A microlens array according to the present invention has a first light-transmitting layer having a plurality of lenses and a mark having at least one of a raised part and a recessed part formed, a reflecting layer which has a higher reflectance than that of the first light-transmitting layer being formed as the mark; and a second light-transmitting layer formed so as to cover at least the lenses. Thus, the first light-transmitting layer is easily aligned with other members by using the mark. The microlens array preferably has a black matrix formed between the lenses.

The present invention provides an optical device having the microlens array.

The optical device may preferably have a light source for emitting light toward the microlens array. The optical device may preferably have an imager which light focused by the microlens array enters.

Preferred embodiments of the present invention will now be described in detail with reference to the drawings. However, the present invention is not limited to the following embodiments.

FIG. 1(A) is a plan view showing a master used in this embodiment, and FIG. 1(B) is a sectional view taken along the line IB—IB of the master shown in FIG. 1(A).

The master 10 is used for manufacturing a microlens array. The shape of the master 10 in a plan view is not specifically limited, and may be a circle or a polygon such as rectangle. A lens-forming pattern 12 and mark-forming patterns 14 are formed above the master 10. The lens-forming pattern 12 and the mark-forming patterns 14 may be formed above the same surface (for example, a planar surface).

The lens-forming pattern 12 is used for forming a plurality of lenses 32, which will form at least a portion of the microlens array, above a first light-transmitting layer 30. The lens-forming pattern 12 is formed at the center (other than the end) of any surface of the master 10. The lens-forming pattern 12 includes at least one of a plurality of recessed parts and a plurality of raised parts. In this embodiment, the lens-forming pattern 12 is composed of a plurality of curved surfaces 16.

Each of the curved surfaces 16 has a shape corresponding to the shape of each of lenses 32 in the microlens array.

When the microlens array is directly formed by using the master 10, each of the curved surfaces 16 has an inverted shape of each lens 32. That is, the curved surfaces 16 should be recessed parts in order to form convex lenses, and the curved surfaces 16 should be raised parts in order to form concave lenses. When making a reproduction of the shape of the master 10 by transferring to make the microlens array by transferring the shape of the reproduction, at least a portion of each curved surface 16 on the master 10 is the same as that of the lens 32.

As shown in FIG. 1(A), a plurality of the curved surfaces 16 may be partitioned into a plurality of groups. For example, a plurality of regions (for example, substantially rectangular regions) are partitioned over a plane surface, and at least two curved surfaces 16 are formed in each of the regions. The above curved surfaces 16 formed in each region will form an individual microlens array chip. The master 10 shown in FIG. 1(A) is used for manufacturing a microlens array, in which the chips are integrated, and the microlens array is cut into chips.

The mark-forming patterns 14 are used for forming marks 34, which will form at least a portion of the microlens array, above the first light-transmitting layer 30. The marks 34 may be used for aligning (aligning in two dimensions in many cases) the first light-transmitting layer 30 with other members, for example, a mask 52 (see FIG. 6(A)). A plurality of mark-forming patterns 14 may be formed above the master 10 because the alignment can be accurately performed when using a plurality of marks 34, and a single mark-forming pattern 14 may be formed above the master 10 if the alignment can be accurately performed by using a single mark 34.

Each of the mark-forming patterns 14 has at least one of a recessed part and a raised part. In the embodiment shown in FIG. 1(B), each mark-forming pattern 14 has a recessed part. The mark-forming pattern 14 has a plurality of parts extending in directions crossing each other in a plan view. For example, the mark-forming pattern 14 shown in FIG. 1(A) has a plus shape composed of parts extending along two orthogonal straight lines (X- and Y-axis). The mark-forming pattern 14 is used for forming the mark 34 having parts extending along two orthogonal straight lines (X- and Y-axis). When using the mark 34, two-dimensional alignment (alignment in X-Y coordinates) is easily performed.

In the mark-forming patterns 14, a straight line (for example, a straight line extending along the X-axis) in one of the mark-forming pattern 14 (for example, the left one shown in FIG. 1(A)) and another straight line (for example, another straight line extending along the X-axis) of the other mark-forming pattern 14 (for example, the right one shown in FIG. 1(A)) are positioned on the same line, for example, the line IB—IB shown in FIG. 1(A).

A plurality of mark-forming patterns 14 are preferably formed so as to have a large distance therebetween. For example, a plurality of mark-forming patterns 14 may be formed at each end area (other than the center area) of the master 10, which are on the line (for example, the line IB—IB shown in FIG. 1(A)) extending through the center of the master 10 or near the line. As a result, a plurality of the marks 34 have a large distance therebetween. The alignment error decreases as the distance between the marks 34 increases. The lens-forming pattern 12 may be formed at the center area of the master 10 and the mark-forming patterns 14 may be formed outside of the lens-forming pattern 12 above the master 10.

Both the lens-forming pattern 12 and the mark-forming patterns 14 may have recessed or raised parts. Alternatively, either one of the lens-forming pattern 12 and the mark-forming patterns 14 may have a recessed part, and the other may have a raised part. The depth of each recessed part or the height of each raised part of the lens-forming pattern 12 may be different from the depth of each recessed part or the height of each raised part of each mark-forming pattern 14. Thus, marks having a depth or height different from that of the lenses may be formed. As shown in FIG. 1(B), the recessed part of the mark-forming pattern 14 is deeper than each curved surface 16, which is a recessed part of the lens-forming pattern 12. Thus, marks higher than the lenses may be formed.

FIGS. 2(A) to 2(E) show an exemplary manufacturing process of the master used in this embodiment.

In this embodiment, the lens-forming pattern 12 and the mark-forming patterns 14 are formed above a substrate 20.

Figure 2:
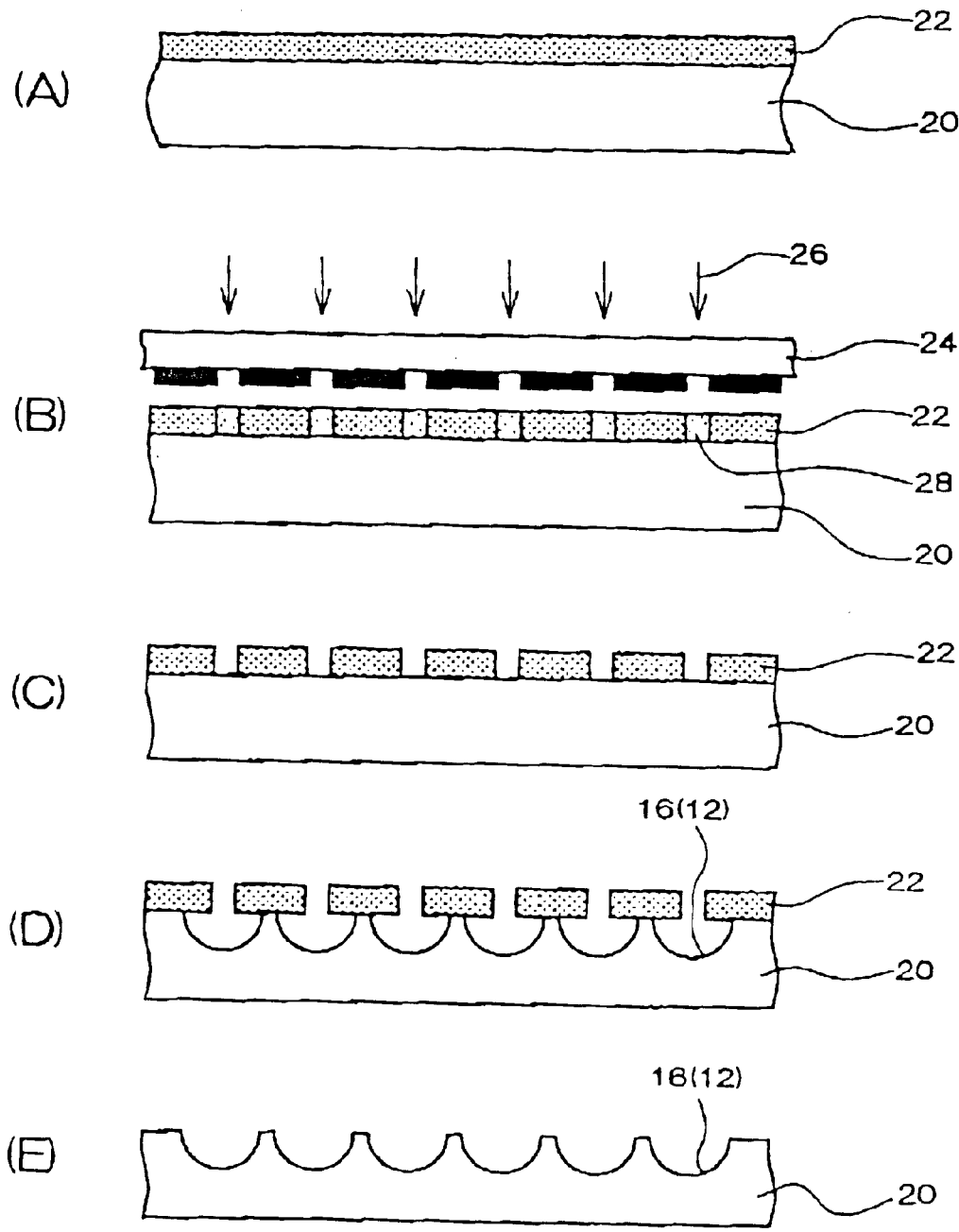
FIGS. 2(A) to 2(E) show a method for manufacturing a master used for manufacturing a microlens array according to an embodiment of the present invention.

As shown in FIG. 2(A), a resist layer 22 is formed above the substrate 20. The substrate 20 is etched to form the lens-forming pattern 12 (in this embodiment, a plurality of curved surfaces 16), the mark-forming patterns 14, and so on. The substrate 20 is not limited to a specific material as long as it is an etchable material, and silicon and quartz are preferable because the curved surfaces 16 are precisely and easily formed by etching.

An exemplary material used for the resist layer 22 may be a commercial positive resist composed of a cresol novolak resin containing a diazonaphthoquinone derivative as a photosensitizer. Such a resist is generally used in a manufacturing process of semiconductor devices.

The positive resist is a material in which regions irradiated with a radiation energy light in accordance with a predetermined pattern are selectively removed with a developing solution.

The resist layer 22 may be formed by spin coating, dipping, spray coating, roll coating, bar coating, or the like.

As shown in FIG. 2(B), a mask 24 is placed above the resist layer 22, and only predetermined regions of the resist layer 22 are irradiated with a radiation energy light 26 through the mask 24. The mask 24 has a pattern having regions through which the radiation energy light 26 passes to form the curved surfaces 16.

The radiation energy light 26 preferably has a wavelength of from 200 nm to 500 nm. When using a light having such a wavelength, lithographic techniques commonly used in a manufacturing process of a liquid crystal panel and the equipment used therefor can be used; hence, a reduction in cost is achieved.

As shown in FIG. 2(C), when the resist layer 22 is irradiated with the radiation energy light 26 and then is developed under predetermined conditions, only specific parts of the resist layer 22, that is, regions 28 irradiated with the radiation energy light 26, are selectively removed; thus, a part of the surface of the substrate 20 is exposed and other regions thereof remain covered with the resist layer 22.

The resist layer 22 is patterned as described above, and then, as shown in FIG. 2(D) the substrate 20 is etched to a predetermined depth by using the resist layer 22 as a mask. In detail, isotropic etching, which proceeds in every direction, is performed on the regions of the substrate 20 which are not covered with the resist layer 22. For example, when using wet etching, the isotropic etching is performed by soaking the substrate 20 in a chemical solution (an etching solution). When quartz is used for the substrate 20, etching is performed by using as an etching solution, for example, a solution (buffered hydrofluoric acid) containing hydrofluoric acid and ammonium fluoride. The concave curved surfaces 16 are formed above the substrate 20 as a result of the isotropic etching.

After completion of etching, as shown in FIG. 2(E), detaching the resist layer 22 allows the curved surfaces 16 (the lens-forming pattern 12) formed above the substrate 20 to appear.

In the above step, a positive resist is used for forming the curved surfaces 16 above the substrate 20. However, a negative resist may be used, whereby regions irradiated with the radiation energy light are made insoluble to developing solutions and other regions not irradiated with the radiation energy light are selectively removed. In this case, a mask having an inverted pattern of the mask 24 is used. Alternatively, without using a mask, the resist may be directly irradiated with a laser beam or an electron beam in a patterned shape.

The mark-forming patterns 14 and the lens-forming pattern 12 may be formed at the same time. In this case, the mark-forming patterns 14 are formed in accordance with the procedure described above. As a result, the mark-forming patterns 14 have individual recessed parts which are curved surfaces. When the mark-forming patterns 14 having other shapes are formed, the mark-forming patterns 14 are formed in a separate step from forming lens-forming pattern 12. For example, when performing anisotropic etching, mark-forming patterns 14 having individual recessed parts having individual walls extending perpendicularly can be formed.

The master 10 is manufactured in the above steps. In this embodiment, once the master 10 has been manufactured, the master 10 may be used many times as long as durability permits, which is economical. The manufacturing step of the master 10 is not necessary in a manufacturing step of the second or subsequent microlens arrays (namely, the manufacturing step of the first light-transmitting layer 30); hence, a reduction in the number of steps and in cost is achieved.

Manufacturing Step of Light-Transmitting Layer

Figure 3:
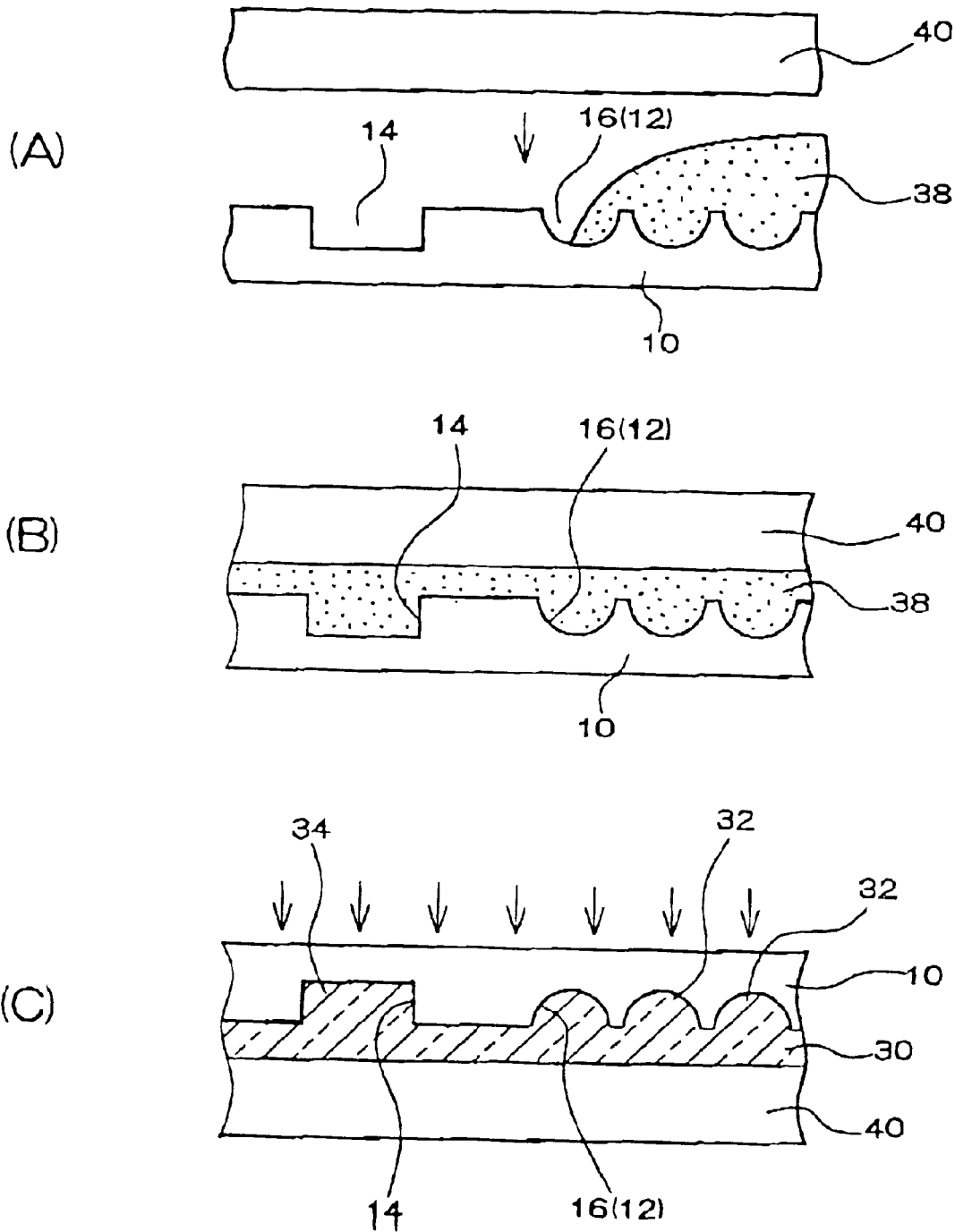
FIGS. 3(A) to 3(C) show a method for manufacturing a microlens array according to an embodiment of the present invention.

By using the above master 10, the first light-transmitting layer 30 having a plurality of lenses 32 and at least one mark 34 (one mark 34 is possible and a plurality of marks 34 are preferable) is formed. As shown in FIG. 3(A), a first light-transmitting layer precursor 38 is provided on the surface of the master 10 on which the lens-forming pattern 12 and the mark-forming patterns 14 are formed. The first light-transmitting layer precursor 38 is preferably a liquid or a liquefiable material. Because it is liquefiable, when the lens-forming pattern 12 (the curved surfaces 16) and the mark-forming patterns 14 are recessed parts, the space in each recessed part is easily filled with liquid. Also, when the lens-forming pattern 12 (the curved surfaces 16) and the mark-forming patterns 14 are raised parts, the space between raised parts is easily filled with liquid. A liquid that is set by applying energy can be used, and among materials having plasticity, a material which is capable of being liquefied can be used.

The first light-transmitting layer precursor 38 is preferably a resin and is not limited to a specific material as long as the material has necessary characteristics such as light transmission when the first light-transmitting layer 30 is formed. A resin having energy-setting property or plasticity is easily obtained and is preferable.

Among the resins having energy-setting property, a resin set by applying at least one of light and heat is preferable. When using light or heat, a heating apparatus such as conventional exposer, baking furnaces, or heaters may be used; thereby achieving a reduction in equipment cost.

Exemplary resins having energy-setting property include an acrylic resin, an epoxy resin, a melamine resin, a polyimide resin and so on. An acrylic resin is particularly preferable because the resin is quickly set by irradiation with light by using various commercial precursors and photosensitizers (photopolymerization initiators).

An exemplary principal component of a photosetting acrylic resin is a prepolymer, an oligomer, a monomer, or a photopolymerization initiator.

Exemplary prepolymers or oligomers include acrylates such as epoxy acrylates, urethane acrylates, polyester acrylates, polyether acrylates, and spiroacetal acrylates; and methacrylates such as epoxy methacrylates, urethane methacrylates, polyester methacrylates, and polyether methacrylates.

Exemplary monomers include monofunctional monomers such as 2-ethylhexyl acrylate, 2-ethylhexyl methacrylate, 2-hydroxyethyl acrylate, 2-hydroxyethyl methacrylate, N-vinyl-2-pyrrolidone, carbitol acrylate, tetrahydrofurfuryl acrylate, isobornyl acrylate, dicyclopentenyl acrylate, and 1,3-butanediol acrylate; bifunctional monomers such as 1,6-hexanediol diacrylate, 1,6-hexanediol dimethacrylate, neopentyl glycol diacrylate, neopentyl glycol dimethacrylate, ethylene glycol diacrylate, polyethylene glycol diacrylate, and pentaerythritol diacrylate; and polyfunctional monomers such as trimethylolpropane triacrylate, trimethylolpropane trimethacrylate, pentaerythritol triacrylate, and dipentaerythritol hexaacrylate.

Exemplary photopolymerization initiators include radical-forming compounds such as acetophenones such as 2,2-dimethoxy-2-phenylacetophenone; butylphenones such as α-hydroxyisobutylphenone and p-isopropyl-α-hydroxyisobutylphenone; halogenated acetophenones such as p-tert-butyldichloroacetophenone, p-tert-butyltrichloroacetophenone, and α,α-dichloro-4-phenoxyacetophenone; benzophenones such as benzophenone and N,N-tetraethyl-4,4-diaminobenzophenone; benzils such as benzil and benzil dimethylketal; benzoins such as benzoin and benzoin alkyl ethers; oximes such as 1-phenyl-1,2-propanedione-2-(o-ethoxycarbonyl)oxime; xanthones such as 2=methylthioxanthone and 2-chlorothioxanthone; Michler's ketone; and benzil methylketal.

If necessary, a compound including amines may be added to prevent setting-inhibition caused by oxygen, and a solvent may be added to assist in applying. The solvent is not specifically limited, and exemplary solvents include propylene glycol monomethyl ether acetate, methoxymethyl propionate, ethoxyethyl propionate, ethyl lactate, ethyl pyruvinate, methyl amyl ketone, and so on.

The above compounds are easily released from silicon or quartz, which are suitable for the material of the master 10 because silicon and quartz are capable of being etched with high accuracy, which is preferable.

Among plastic resins, thermoplastic resins such as polycarbonate resin, polymethylmethacrylate resin, and amorphous polyolefin resins may be used. Such resins are plasticized or liquefied by heating the same to a temperature exceeding the softening point, and then are applied onto the master 10 as shown in FIG. 3A.

Next, a step of spreading the first light-transmitting layer precursor 38 is performed. For example, as shown in FIG. 3(B), a substrate 40 is bonded to the master 10 while sandwiching the first light-transmitting layer precursor 38 therebetween; thereby spreading the first light-transmitting layer precursor 38 over a predetermined region.

The substrate 40 may have at least a function required for spreading the first light-transmitting layer precursor 38. One surface of the substrate 40 may be flat, and the flat surface may be pressed to the first light-transmitting layer precursor 38 in this case. If the substrate 40 is left adhered to the first light-transmitting layer 30, the substrate 40 is not limited to a specific material as long as the substrate 40 has characteristics such as mechanical strength and optical properties, for example, light transmission, which is necessary for a microlens array. Exemplary materials for the substrate 40 may be quartz, glass, or a plastic substrate or film, wherein the plastic includes polycarbonate, polyarylate, polyethersulfone, polyethylene terephthalate, poly(methyl methacrylate), and amorphous polyolefins. If the substrate 40 is detached in a subsequent step, the substrate 40 does not need to have light transmission.

When the substrate 40 is bonded to the master 10 while sandwiching the first light-transmitting layer precursor 38 therebetween, the first light-transmitting layer precursor 38 may be pressed with at least one of the master 10 and the substrate 40, as necessary. The spreading time of the first light-transmitting layer precursor 38 is reduced by pressing; hence, the operation is improved, and the recessed parts or the spaces between the raised parts formed above the master 10 are filled effectively with the first light-transmitting layer precursor 38.

The shapes of the lens-forming pattern 12 and the mark-forming patterns 14 above the master 10 are transferred to the first light-transmitting layer precursor 38 by bonding the substrate 40 to the master 10 while sandwiching the first light-transmitting layer precursor 38 therebetween. In detail, the inverted shapes of the lens-forming pattern 12 and the mark-forming patterns 14 are formed above the first light-transmitting layer precursor 38.

In the embodiment shown in FIGS. 3(A) and 3(B), the first light-transmitting layer precursor 38 is placed above the master 10 and then the substrate 40 is bonded to the master 10. Instead of this method, the following procedure is possible: the first light-transmitting layer precursor 38 is placed above the substrate 40, the master 10 is placed thereon, and then the first light-transmitting layer precursor 38 is spread by the substrate 40 and the master 10. Also, the first light-transmitting layer precursor 38 may be provided above both the master 10 and the substrate 40 in advance.

After the above step, as shown in FIG. 3(B), a layer composed of the first light-transmitting layer precursor 38 is formed between the master 10 and the substrate 40. Then, solidification is performed depending above the first light-transmitting layer precursor 38. For example, when using a photosetting resin, the resin is irradiated with light under required conditions. As shown in FIG. 3(C), the first light-transmitting layer precursor 38 is solidified to form the first light-transmitting layer 30.

When the first light-transmitting layer 30 is composed of a photosetting material, at least one of the substrate 40 and the master 10 must have light transmission. Alternatively, when a resin plasticized by heating up to a temperature exceeding the softening point is used as the first light-transmitting layer precursor 38, the resin is solidified by cooling.

The light-transmitting layer 30 has a plurality of lenses 32. The plurality of lenses 32 form a shape (an inverted shape, in detail) in response to the lens-forming pattern 12. Each of the lenses 32 has a shape (an inverted shape, in detail) in response to each of the curved surfaces 16. When the curved surfaces 16 are recessed parts, the lenses 32 are convex. In a variation, when the curved surfaces are raised parts, the lenses are concave.

The first light-transmitting layer 30 has at least one mark 34 (may be referred to as an alignment mark): one mark is acceptable but a plurality of marks are preferable. The mark 34 has a shape corresponding to the shape of each mark-forming pattern 14. That is, the mark 34 has the inverted shape of the mark-forming pattern 14 (described above). When the mark-forming pattern 14 is a recessed part, the mark 34 is a raised part. In a variation, when the mark-forming pattern is a raised part, the mark is a recessed part.

Figure 4:
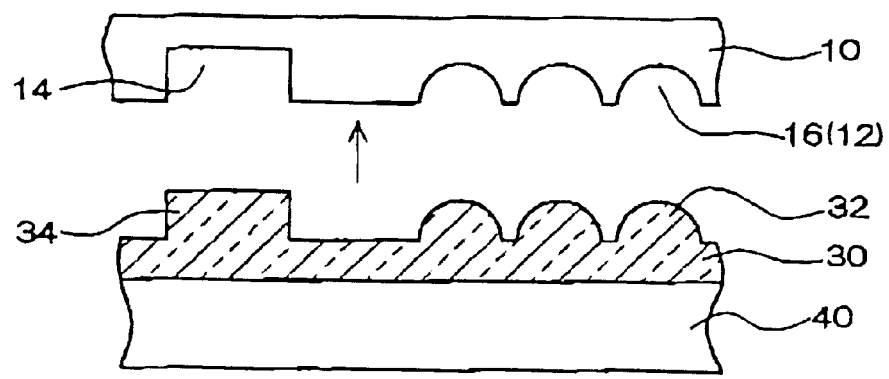
FIGS. 4(A) to 4(C) show a method for manufacturing a microlens array according to an embodiment of the present invention.
Figure 4:
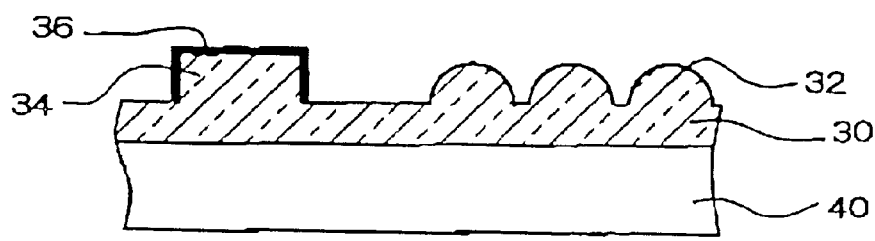
Figure 4:
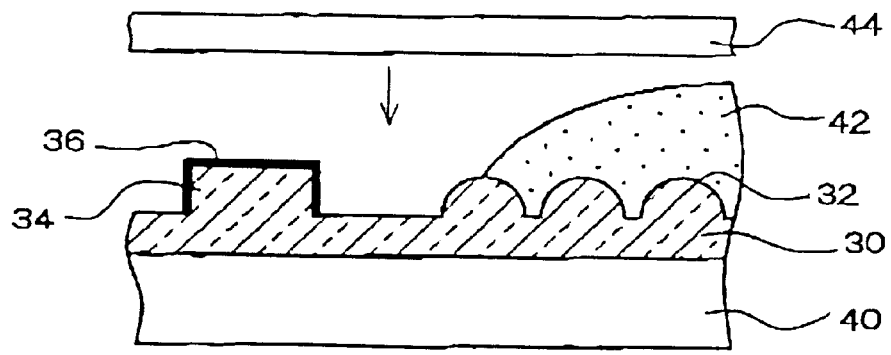

Next, as shown in FIG. 4(A), the master 10 is stripped from the first light-transmitting layer 30. The first light-transmitting layer 30 has a plurality of lenses 32 and at least one mark 34, which are integrated.

As shown in FIG. 4(B), a reflecting layer 36 is formed on the mark 34. The reflecting layer 36 may be formed above only the upper face or may be formed above the upper face and the side faces. Also, the reflecting layer 36 may be formed around the mark 34. The reflecting layer 36 has a higher reflectance than that of the first light-transmitting layer 30. The reflecting layer 36 may be composed of a metal such as Cr, Al, or Au, or a resin such as a color resist. In detail, the reflecting layer 36 may be formed by sputtering or vapor deposition when using a metal, or may be formed with a dispenser or by an ink jet method when using a resin. The reflecting layer 36 may have a thickness of 50 to 5000 Å ($10^{-10}$ m) when using Cr. The reflecting layer 36 may be formed at only the mark 34 and may be formed on or around the mark 34. When formed only on the mark 34, the reflecting layer 36 may be formed by covering regions other than the mark 34 with a resist patterned by lithography.

Next, a second light-transmitting layer 46 is formed above the first light-transmitting layer 30. The second light-transmitting layer 46 may cover at least the lenses 32, and may cover the mark 34 (and the reflecting layer 36). An exemplary method for forming the second light-transmitting layer 46 will now be described.

As shown in FIG. 4(C), a reinforcing plate 44 is bonded to the first light-transmitting layer 30 while sandwiching a second light-transmitting layer precursor 42 therebetween. The surface of the first light-transmitting layer 30 to which the lenses 32 are formed faces the reinforcing plate 44.

The description given for the first light-transmitting layer precursor 38 is also applicable to the second light-transmitting layer precursor 42. Also, the description given for the first light-transmitting layer precursor 38 is also applicable to the method of providing the second light-transmitting layer precursor 42 and the method of spreading the same. As described above, the step of bonding the reinforcing plate 44 with the first light-transmitting layer 30 is performed.

The reinforcing plate 44 is not limited to a specific material as long as the reinforcing plate 44 has satisfactory optical properties such as light transmission and characteristics such as mechanical strength, which are required for microlens arrays, and substrates or films used for the above-mentioned substrate 40 may be used for the reinforcing plate 44. Alternatively, a glass substrate may be used for the reinforcing plate 44. The reinforcing plate 44 need not have light transmission if the reinforcing plate 44 is detached in a subsequent step, and in such a case the reinforcing plate 44 temporarily reinfoeces the first light-transmitting layer 30.

Figure 5:
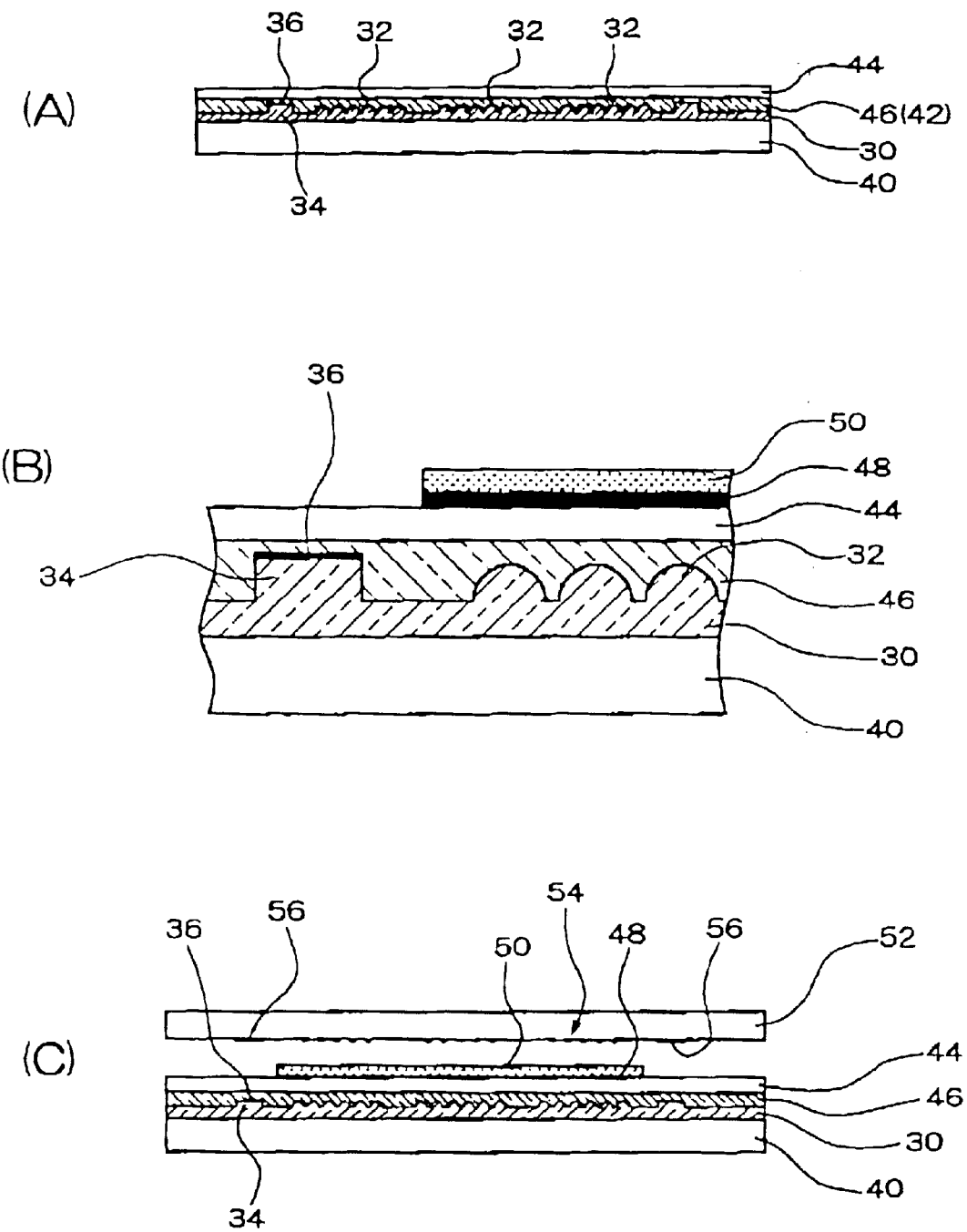
FIGS. 5(A) to 5(C) show a method for manufacturing a microlens array according to an embodiment of the present invention.

As shown in FIG. 5(A), the second light-transmitting layer 46 is formed between the first light-transmitting layer 30 and the reinforcing plate 44. For example, curing depending on the composition of the second light-transmitting layer precursor 42 is performed to set the same, and this results in the second light-transmitting layer 46 being formed. When using a UV-setting acrylic resin, the second light-transmitting layer precursor 42 is set by UV irradiation under predetermined conditions.

The reinforcing plate 44 may be detached as long as the second light-transmitting layer 46 has satisfactory characteristics such as mechanical strength, gas barrier properties, and chemical resistance, which are required for microlens arrays. In such a case, the reinforcing plate 44 temporarily reinforces the second light-transmitting layer 46.

Step of Forming Layer and Etching

The manufacturing method of a microlens array according to this embodiment further includes the steps of forming a layer and etching the same. A step of, for example, forming a light shield material to form a black matrix will now be described.

In this embodiment, as shown in FIG. 5(B), a light shield material 48 is formed. The light shield material 48 is formed so as to avoid the mark 34 such that the mark 34 can be seen from the side above which the light shield material 48 is formed. The light shield material 48 is formed by depositing a light shield material. The light shield material 48 may be formed so as not to be in contact with the first light-transmitting layer 30. For example, the light shield material 48 is formed above the reinforcing plate 44, or is formed above the second light-transmitting layer 46 when the reinforcing plate 44 is not provided. Alternatively, the light shield material 48 may be formed on (in contact with) the first light-transmitting layer 30. For example, when the second light-transmitting layer 46 is not formed, the light shield material 48 may be formed above the surface of the first light-transmitting layer 30 above which the lenses 32 are formed.

In a variation, the light shield material 48 may be formed at the side opposite to the lenses 32 above the first light-transmitting layer 30. For example, the light shield material 48 may be formed above the substrate 40. In this case, the light shield material 48 is formed so as not to be in contact with the first light-transmitting layer 30. Alternatively, when the substrate 40 is not provided, the light shield material 48 may be formed on (in contact with) the surface of the first light-transmitting layer 30 which is opposite to the lenses 32.

A resist layer 50 is formed above the light shield material 48. The description given for the resist layer 22 and the forming method thereof with reference to FIG. 2(A) is applicable to the resist layer 50 and the method for forming the same. In particular, when the resist layer 50 has little or no light transmission, the resist layer 50 may be preferably formed so as to avoid the mark 34 such that the mark 34 can be seen from the side above which the resist layer 50 is formed. When having light transmission, the resist layer 50 may cover the mark 34.

Next, as shown in FIG. 5(C), the mask 52 is aligned with the resist layer 50 and is placed thereon.

Figure 6:
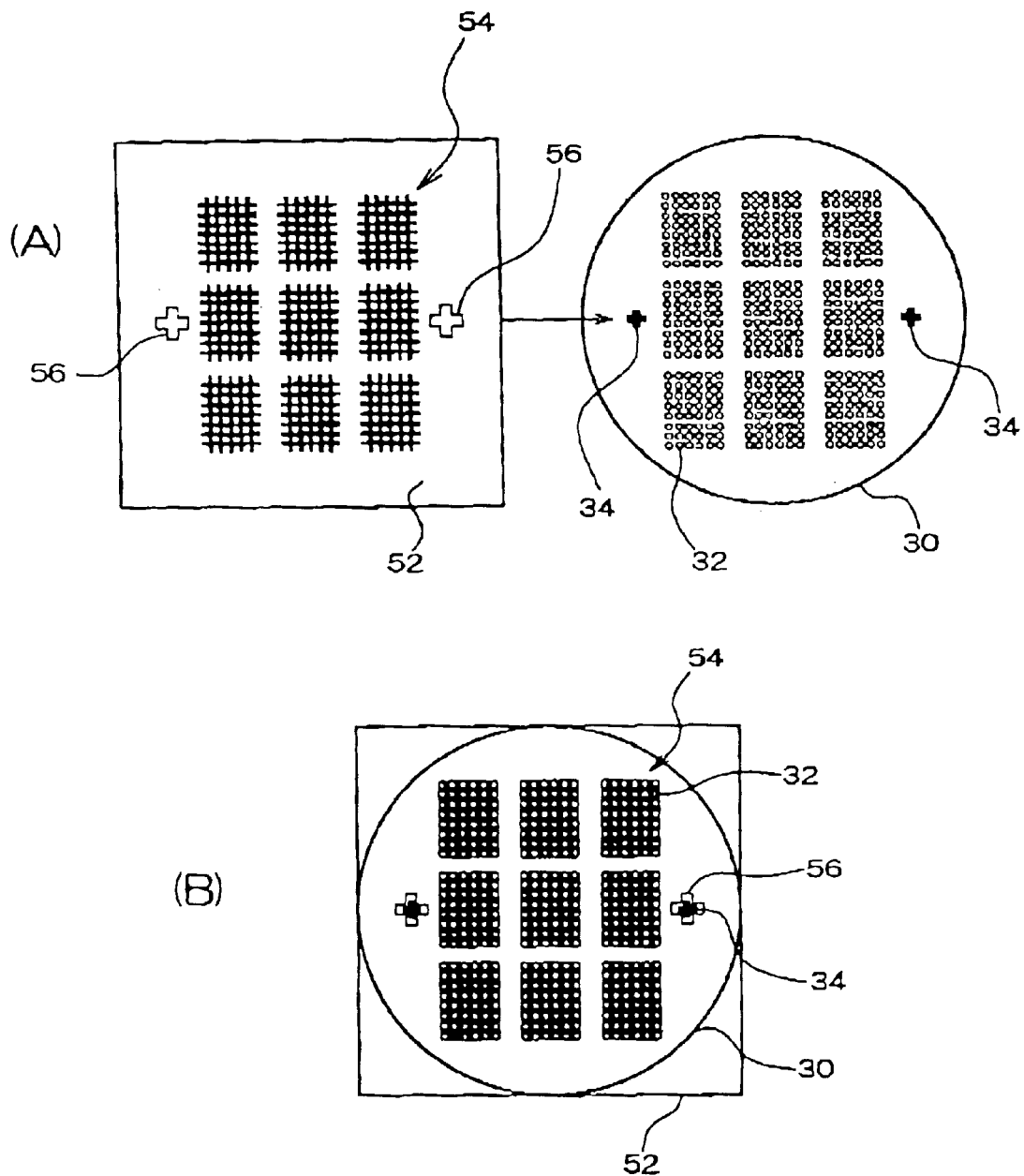
FIGS. 6(A) and 6(B) show a method for manufacturing a microlens array according to an embodiment of the present invention.

FIGS. 6(A) and 6(B) show a step for aligning the mask 52. The mask 52 has a pattern 54 for forming a black matrix. The pattern 54 shown in FIG. 6(A) has a configuration which does not transmit radiation energy light in a region for forming the black matrix; however, the pattern 54 may have a configuration inverted with reference to the above. The mask 52 has at least one (a plurality of, in many cases) mark 56. The mark 56 is used for aligning the mask 52 with the first light-transmitting layer 30. The mark 56 may be referred to as an alignment mark. The mark 56 may have a similar shape to the mark 34. The mark 56 may also have a shape surrounding at least a portion of (or the whole of) the mark 34. The mark 56 shown in FIG. 6(A) has an outline of a plus shape, and the internal surface of the outline may be colored.

As shown in FIG. 6(B), the mark 56 is aligned with the first light-transmitting layer 30 by fitting the mark 34 in the other mark 56. In this case, minute plus shapes can be observed when enlarging the images of the marks 34 and 56 with an optical microscope or the like. In the first light-transmitting layer 30, the mark 34 has a higher reflectance than those of other parts due to the reflecting layer 36 formed on the mark 34. Thus, the mark 34 is easily recognized due to the light interference and the like. When the side surfaces and the upper surface of the mark 34 form corners, the shape of the mark 34 can be more easily recognized. According to this embodiment, since the mark 34 is easily recognized, auto alignment is possible.

Figure 7:
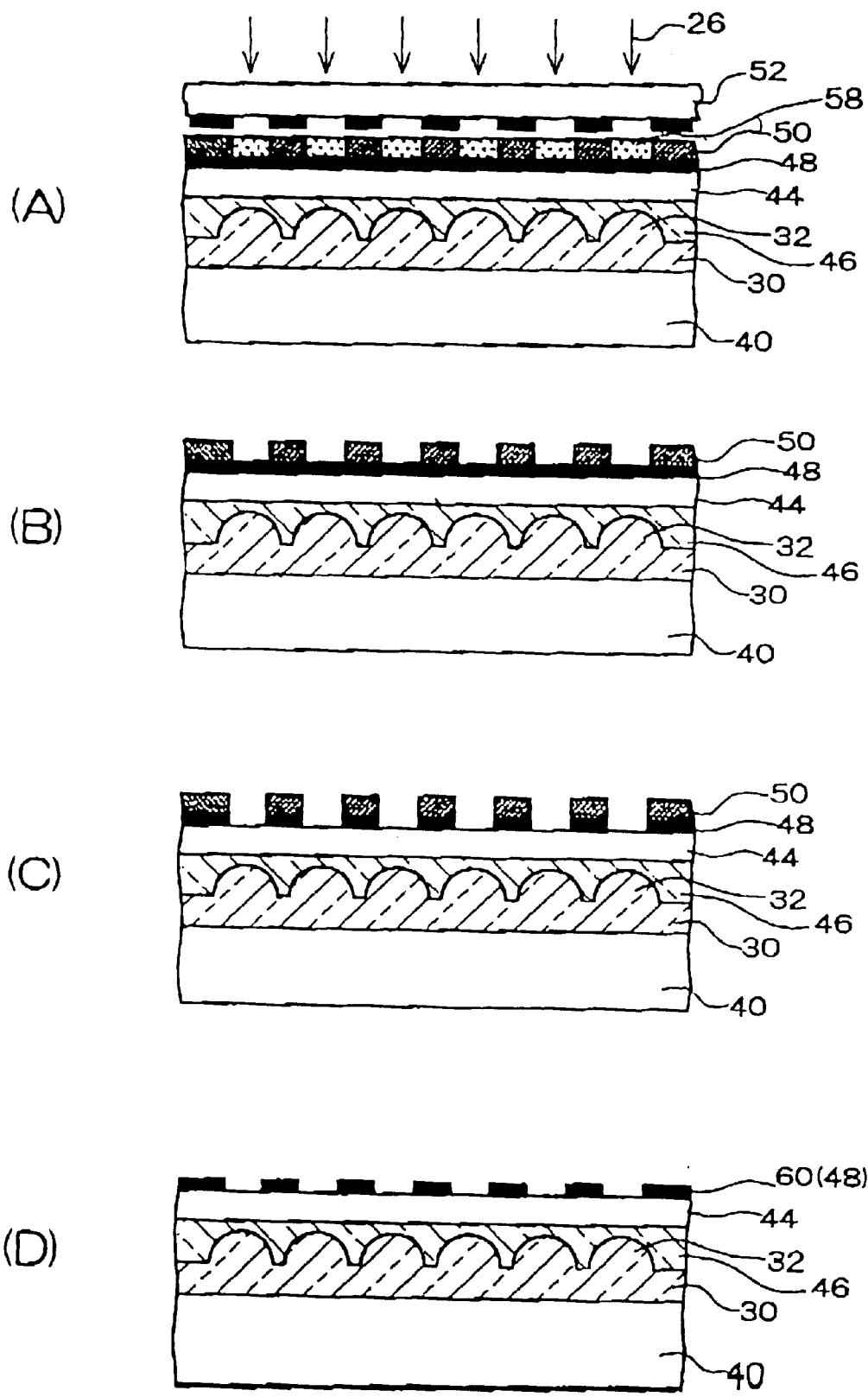
FIGS. 7(A) to 7(D) show a method for manufacturing a microlens array according to an embodiment of the present invention.

As shown in FIG. 7(A), only predetermined regions above the resist layer 50 are irradiated with the radiation energy light 26 through the mask 52. As shown in FIG. 7(B), as a result of development under predetermined conditions, areas 58 irradiated with the radiation energy light 26 are removed, so that the surface of the light shield material 48 partly appears and other areas remain covered with the resist layer 50.

As shown in FIG. 7(C), etching is performed using the patterned resist layer 50 as a mask. Known methods may be used for the etching. As shown in FIG. 7(D), the resist layer 50 is removed. As a result, the light shield material 48 is patterned to form a black matrix 60. The black matrix 60 is formed between the lenses 32 and is preferably formed so as to surround each of the lenses 32; thereby improving the contrast between pixels.

In this embodiment, since the first light-transmitting layer 30 can be easily aligned with another member (the mask 50, in this embodiment) by using the mark 34, the black matrix 60 is formed at the correct position.

Figure 8:
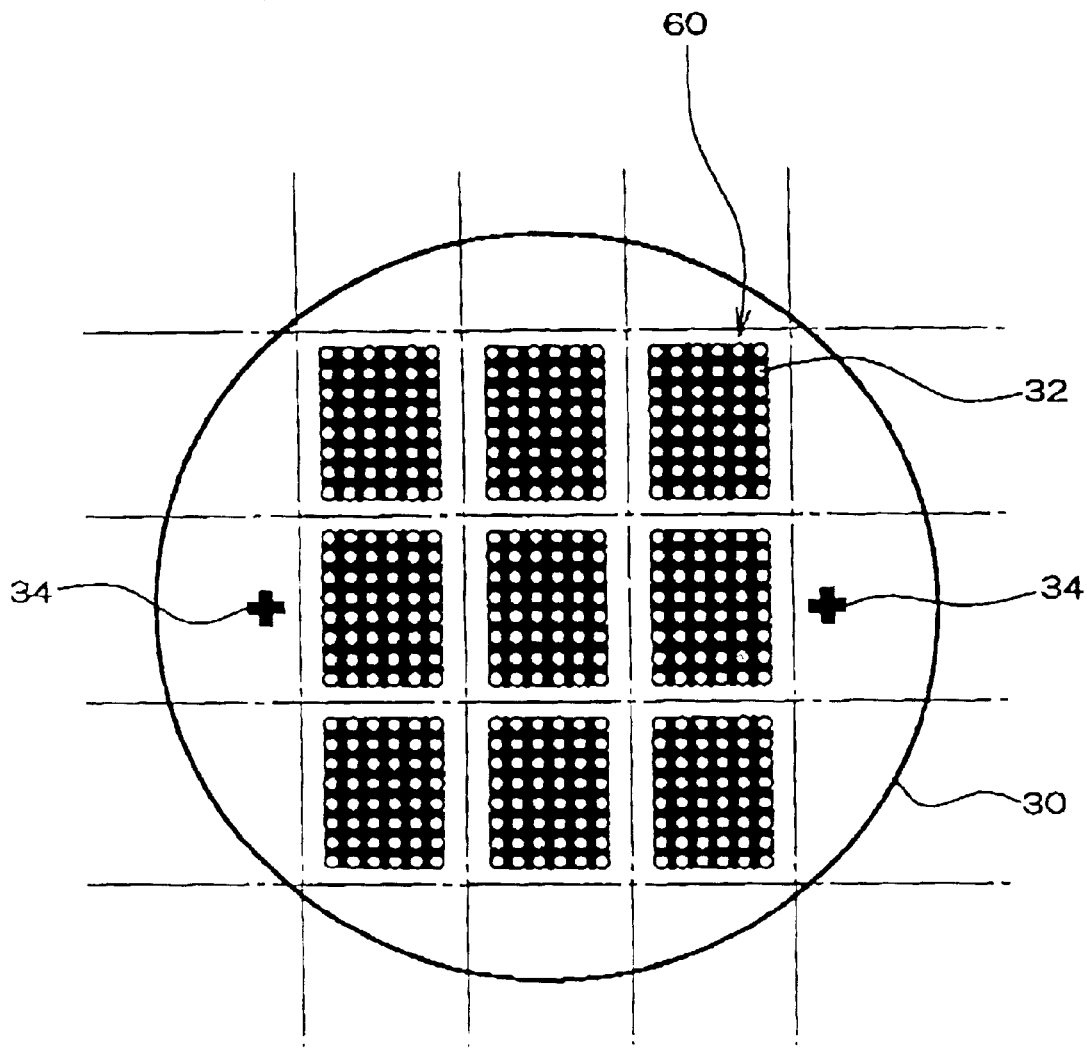
FIG. 8 shows a method for manufacturing a microlens array according to an embodiment of the present invention.

In this embodiment, the lenses 32 formed above the first light-transmitting layer 30 are partitioned into a plurality of groups depending on the configuration of the plurality of groups into which the curved surfaces 16 above the master 10 are partitioned. Thus, as shown in FIG. 8, the first light-transmitting layer 30 (together with the substrate 40, the second light-transmitting layer 46, and the reinforcing plate 44) is cut into a plurality of chips. That is, the microlens array including the entire first light-transmitting layer 30 (together with the substrate 40, the second light-transmitting layer 46, and the reinforcing plate 44) is formed by integrating a plurality of microlens array chip. Alternatively, the entire first light-transmitting layer 30 (together with the substrate 40, the second light-transmitting layer 46, and the reinforcing plate 44) may be used as the finished product.

Optical Device

Figure 9:
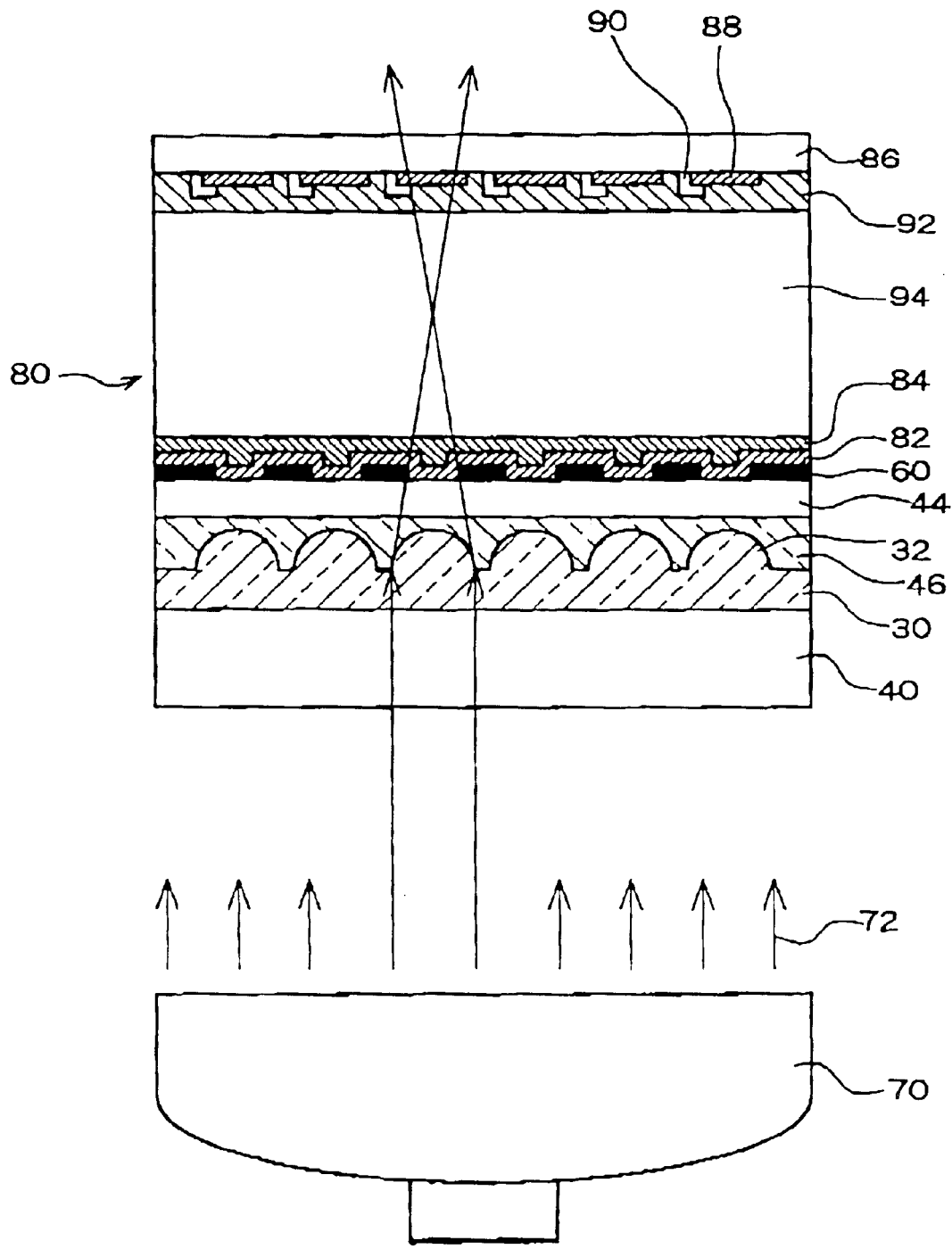
FIG. 9 shows an optical device having a microlens array according to the present invention.

FIG. 9 shows a portion of a LCD projector which is an exemplary optical device having a microlens array according to the present invention. The LCD projector has a lamp 70 functioning as a light source and a light valve 80 including a chip (a microlens array chip) obtained by cutting the microlens array manufactured by the above method.

The microlens array chip is disposed in such a manner that the surfaces of the lenses 32 are concave when viewed from the lamp 70. In a variation, the surfaces of the lenses 32 may be convex when viewed from the lamp 70. The second light-transmitting layer 46 is disposed on the lenses 32, and the black matrix 60 is provided above the reinforcing plate 44. Transparent common electrodes 82 and an orientation film 84 are further disposed above the black matrix 60.

The light valve 80 has a TFT substrate 86 and the orientation film 84 with a space provided therebetween. The TFT substrate 86 has individual electrodes 88, which are transparent, and a thin-film transistor 90 above which another orientation film 92 is provided above. The orientation film 92 above the TFT substrate 86 faces the other orientation film 84.

The space between the orientation filmls 84 and 92 is filled with a liquid crystal 94, and the liquid crystal 94 is driven by voltage controlled by the thin-film transistor 90.

In this LCD projector, light 72 emitted from the lamp 70 is focused by each lens 32 for each pixel; hence, the display is bright.

Figure 10:
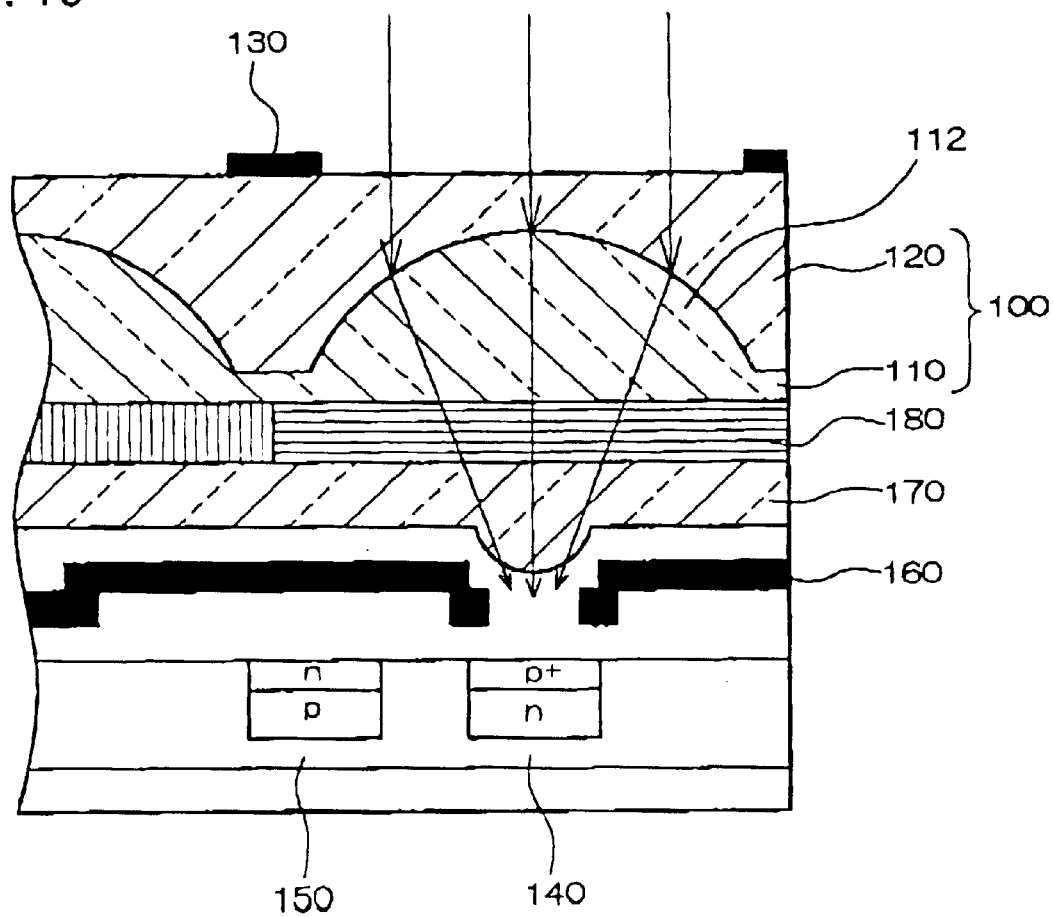
FIG. 10 shows an optical device having a microlens array according to the present invention.

FIG. 10 shows another optical device according to the present invention. Specifically, this optical device is specifically an image pickup unit.

The image pickup unit has an imager (an image sensor). For example, in a two-dimensional image sensor, a light detecting part (for example, a photodiode) 140 is provided for each of a plurality of pixels. In an imager which is a CCD (Charge Coupled Device) type, a transferring part 150 for quickly transferring a charge received from the light detecting part 140 of each pixel is provided. A light shield material 160 or an inner lens 170 may be provided in order to prevent the light detecting part 140 from receiving light from pixels which do not correspond thereto. In a color imager, a color filter 180 is provided.

The imager is provided with a microlens array 100 according to the present invention. The microlens array 100 may be manufactured by the method described in the above embodiment, and has light-transmitting layers 110 and 120 and a black matrix 130. Light is refracted at the interface between the light-transmitting layer 120 and a lens 112 formed above the light-transmitting layer 110, and is then focused. Each pixel has the lens 112, and the focused light enters each light detecting part 140.

Other Embodiments

Figure 11:
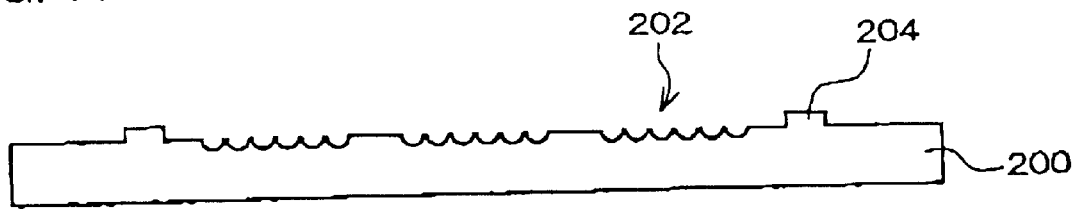
FIG. 11 shows another embodiment of the present invention.

As shown in FIG. 11, a master 200 includes a lens-forming pattern 202 composed of recessed parts and a mark-forming pattern 204 composed of raised parts. A first light-transmitting layer having convex lenses and concave marks is formed with the master 200.

Figure 12:
FIG. 12 shows another embodiment of the present invention.

As shown in FIG. 12, a master 210 includes a lens-forming pattern 212 composed of raised parts and a mark-forming pattern 214 composed of recessed parts. A first light-transmitting layer having lenses of recessed parts and marks of raised parts is formed with the master 210.

Figure 13:
FIG. 13 shows another embodiment of the present invention.

As shown in FIG. 13, a master 220 includes a lens-forming pattern 222 composed of raised parts and a mark-forming pattern 224 composed of raised parts. A first light-transmitting layer having lenses of recessed parts and marks of recessed parts is formed with the master 220.

Figure 14:
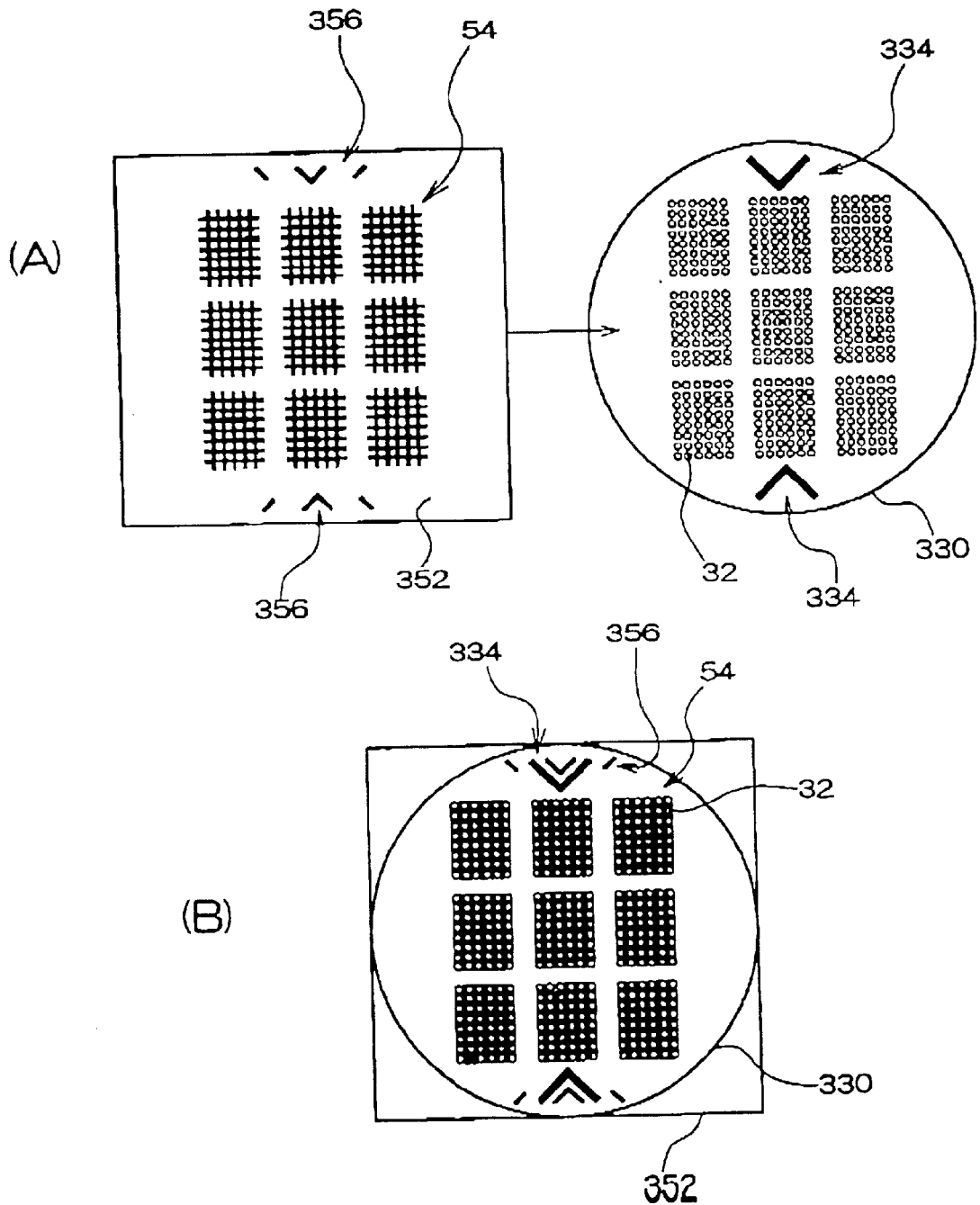
FIGS. 14(A) and 14(B) show another embodiment of the present invention.

FIG. 14(A) shows a variation of the marks. A first light-transmitting layer 330 has marks 334, each having a V shape in plan view. Each of the marks 334 is composed of at least one of a raised part and a recessed part. A mask 352 has other marks 356 used in alignment with the marks 334 having the above shape. FIG. 14(B) shows the state in which the marks 334 are aligned with the corresponding marks 356.

Each of the marks 356 of the mask 352 has a V-shaped part for fitting into the inside of the V shape of each mark 334. The two straight lines forming the V-shaped part are parallel to the other straight lines forming the V shape of the mark 334. The mark 356 further has two other straight lines for positioning at the outside of the V shape of the mark 334, and these two straight lines are parallel to the straight lines forming the V shape of the mark 334. Thus, the mask 352 is aligned with the first light-transmitting layer 330 by placing the mark 334 between the V-shaped part and the straight lines of the mark 356 to arrange the corresponding straight lines in parallel. When using the above marks 334 and 356, effects described in the other embodiments are also achieved.

The present invention is not limited to the above embodiments, and different variations may be possible. For example, the black matrix may be formed by etching the layer in the above embodiment, and transparent electrodes (ITO patterns) may be additionally formed.

The master 10, the lenses 32, and the mark 34 are formed in the same step in the above embodiment; however, the master 10, the lenses 32, and the mark 34 may be formed in other steps. In the latter method, lenses may be formed with a first master above which a lens-forming pattern is formed, and marks may be formed with a second master on which a mark-forming pattern is formed (the order of forming may be changed). Since this embodiment has the same effects as the above other embodiments, and since the marks and the lenses are formed in other steps in this embodiment, marks having a different depth or height and a different shape may be formed regardless of the lens-forming pattern. Accordingly, there is more freedom in the method for forming a master and a mark-forming pattern; hence, minute marks may be more precisely formed.

A microlens array according to the above embodiments of the present invention may be provided in the optical device described above, and may be preferably provided in electrooptical devices such as liquid crystal devices and organic electroluminescence devices. Furthermore, such electrooptical devices may be used for electronic devices such as direct-view displays used for various electronic devices and projection displays such as projectors. These electronic devices include monitors (displays) used for personal computers such as laptop personal computers and notebook-size personal computers, television monitors, video phones monitors, monitors for portable electronic devices such as mobile phones (including PHS), electronic notebooks, electronic dictionaries, electronic cameras (digital cameras), and video cameras.

What is claimed is:

1. A method for manufacturing a microlens array comprising the steps of:
    forming a reflecting layer as a mark in a first light-transmitting layer having a plurality of lenses, the mark being composed of at least one of a raised part and a recessed part, the reflecting layer having a higher reflectance than a reflectance of the first light-transmitting layer; and
    forming a second light-transmitting layer so as to cover at least the lenses.

2. The method for manufacturing a microlens array according to claim 1, further comprising the steps of:
    forming the first light-transmitting layer having the lenses and the mark, which are integrated, by using a first light-transmitting layer precursor; and
    forming the second light-transmitting layer by providing a second light-transmitting layer precursor above the first light-transmitting layer.

3. The method for manufacturing a microlens array according to claim 2, further comprising the steps of:
    providing the first light-transmitting layer precursor above a surface of a master having a lens-forming pattern and a mark-forming pattern;
    transferring the shapes of the lens-forming pattern and the mark-forming pattern to the first light-transmitting layer precursor; and
    detaching the first light-transmitting layer, comprising the first light-transmitting layer precursor, from the master.

4. The method for manufacturing a microlens array according to claim 1, further comprising the step of:
    forming a layer and etching the layer after forming the second light-transmitting layer;
    the etching being performed after covering the layer with a resist patterned in a lithography step, and a mask used in the lithography step being aligned with the first light-transmitting layer by using the mark.

5. A microlens array comprising:
    a first light-transmitting layer having a plurality of lenses and a mark having at least one of a raised part and a recessed part;
    the mark being formed by a reflecting layer which has a higher reflectance than a reflectance of the first light-transmitting layer; and
    a second light-transmitting layer formed so as to cover at least the lenses.

6. The microlens array according to claim 5, further comprising a black matrix formed between the lenses.

7. An optical device comprising the microlens array according to claim 5.

8. The optical device according to claim 7, further comprising a light source for emitting light toward the microlens array.

9. The optical device according to claim 8, further comprising an imager which light focused by the microlens array enters.

10. An electronic device comprising an electrooptical device having the microlens array according to claim 5.

11. A method for manufacturing an optical device equipped with a microlens array, comprising the steps of:
    manufacturing the microlens array comprising the substeps of:
        forming a reflecting layer as a mark in a first light-transmitting layer having a plurality of lenses, the mark being composed of at lest one of a raised part and a recessed part, the reflecting layer having a higher reflectance than a reflectance of the first light-transmitting layer; and forming a second light-transmitting layer so as to cover at least the lenses; and
    providing another component of the optical device with the microlens array.

12. A method for manufacturing an electrooptical device equipped with a microlens array, comprising the steps of:
    manufacturing the microlens array comprising the substeps of:
        forming a reflecting layer as a mark in a first light-transmitting layer having a plurality of lenses, the mark being composed of at least one of a raised part and a recessed part, the reflecting layer having a higher reflectance than a reflectance of the first light-transmitting layer; and forming a second light-transmitting layer so as to cover at least the lenses; and
    providing another component of the electrooptical device with the microlens array.

13. The method according to claim 12, said another component further comprising a light source.

14. The method according to claim 12, said another component further comprising a light valve.

15. A method for manufacturing an electronic device equipped with a microlens array, comprising the steps of:

manufacturing the microlens array comprising the substeps of:

forming a reflecting layer as a mark in a first light-transmitting layer having a plurality of lenses, the mark being composed of at least one of a raised part and a recessed part, the reflecting layer having a higher reflectance than a reflectance of the first light-transmitting layer; and forming a second light-transmitting layer so as to cover at least the lenses; and providing another component of the electronic device with the microlens array.

* * * * *

UNITED STATES PATENT AND TRADEMARK OFFICE
CERTIFICATE OF CORRECTION

PATENT NO. : 6,597,509 B2
DATED : July 22, 2003
INVENTOR(S) : Takakuwa et al.

It is certified that error appears in the above-identified patent and that said Letters Patent is hereby corrected as shown below:

<u>Column 7,</u>
Line 41, "2=methylthioxanthone" should be -- 2-methylthioxanthone --;

<u>Column 8,</u>
Line 47, delete "above" and substitute -- upon -- therefor;

<u>Column 12,</u>
Line 11, delete "filmls" and substitute -- films -- therefor;

<u>Column 14,</u>
Line 40, delete "lest" and substitute -- least -- therefor.

Signed and Sealed this

Third Day of February, 2004

JON W. DUDAS
*Acting Director of the United States Patent and Trademark Office*